United States Patent
Kanno et al.

(10) Patent No.: US 8,554,886 B2
(45) Date of Patent: Oct. 8, 2013

(54) WIRELESS COMMUNICATION TERMINAL AND COMMUNICATION SYSTEM SELECTION METHOD

(75) Inventors: Issei Kanno, Fujimino (JP); Kosuke Yamazaki, Fujimino (JP)

(73) Assignee: KDDI Corporation, Tokyo (JP)

( * ) Notice: Subject to any disclaimer, the term of this patent is extended or adjusted under 35 U.S.C. 154(b) by 261 days.

(21) Appl. No.: 12/872,954

(22) Filed: Aug. 31, 2010

(65) Prior Publication Data

US 2011/0055363 A1 Mar. 3, 2011

(30) Foreign Application Priority Data

Aug. 31, 2009 (JP) ................................ 2009-200565

(51) Int. Cl.
*G06F 15/173* (2006.01)
(52) U.S. Cl.
USPC ....................................................... 709/221
(58) Field of Classification Search
None
See application file for complete search history.

(56) References Cited

U.S. PATENT DOCUMENTS

| 7,502,350 | B2 | 3/2009 | Sugita | |
|---|---|---|---|---|
| 2003/0165126 | A1 | 9/2003 | Sugita | |
| 2005/0239443 | A1* | 10/2005 | Watanabe et al. | 455/414.1 |
| 2005/0239497 | A1* | 10/2005 | Bahl et al. | 455/552.1 |
| 2007/0171996 | A1* | 7/2007 | Miyabayashi | 375/295 |

FOREIGN PATENT DOCUMENTS

| JP | 2003-209537 A | 7/2003 |
|---|---|---|
| JP | 2004-088521 | 3/2004 |
| JP | 2005-026878 | 1/2005 |
| JP | 2005-315625 A | 11/2005 |
| JP | 2006-262178 | 9/2006 |

OTHER PUBLICATIONS

Office Action and the English translation thereof from related Japanese Patent Application No. 2009-200565 issued on Jan. 25, 2013.

* cited by examiner

*Primary Examiner* — Scott Christensen
(74) *Attorney, Agent, or Firm* — Mitchell P. Brook; McKenna Long & Aldridge LLP

(57) ABSTRACT

A wireless communication terminal and a communication system selection method are capable of selecting a communication system having high battery usage efficiency by keeping battery remaining time long and satisfying throughput required by the application depending on scenes. The wireless communication terminal 100 capable of selecting plural communication systems comprises an application information acquisition unit 170 for acquiring a type of used application;

an evaluation amount calculation unit 166 for changing a communication system selection criterion in response to the type of application thus acquired and calculating an evaluation amount with respect to time adding predetermined time to communication system switching time; and a system selection unit 167 for comparing the evaluation amounts thus calculated and selecting any one of communication systems. Therefore, it is possible to select/switch to the communication system having high battery usage efficiency among plural systems in response to a real-time requirement of the application.

9 Claims, 6 Drawing Sheets

WIRELESS COMMUNICATION TERMINAL AND COMMUNICATION SYSTEM SELECTION METHOD

FIELD OF THE INVENTION

The present invention relates to a wireless communication terminal and a method of selecting an appropriate communication system.

BACKGROUND OF THE INVENTION

Description of the Related Art

In a multimode terminal capable of selecting plural communication systems, there has been conventionally known a terminal which determines switching of a communication system in reference to reception quality such as RSSI and CINR of various communication systems, throughput, power consumption, and complex index of these (e.g. Japanese Patent Publication No. 4085748, Japanese Unexamined Patent Application Publication No. 2006-262178, and Japanese Unexamined Patent Application Publication No. 2005-26878).

According to a complex cell phone device of Japanese Patent Publication No. 4085748, it is controlled to switch to a communication system of the lowest power consumption in a case where battery remaining level falls below a threshold value set up beforehand. According to a wireless communication terminal of Japanese Unexamined Patent Application Publication No. 2006-262178, reception quality (such as RSSI and CINR) is first measured and then a channel variation value is calculated based on thus measured value. A threshold value is set up beforehand on a reception quality for determining whether or not switching is carried out with respect to a variation level corresponding to thus calculated value, and it is compared with the measured value. This operation avoids frequent switching of communication systems. Here, the threshold value is independently set up by respective wireless systems. According to a wireless terminal device of Japanese Unexamined Patent Application Publication No. 2005-26878, it is determined whether or not a communication system is switched by comparison between switch time of communication system and a delay amount allowed by an application.

According to the conventional terminals described above, a communication system of the lowest power consumption is selected in a case where the remaining battery level falls below the threshold value, and a communication system is selected in response to the electric wave state in a case where the threshold value is exceeded. For this reason, it is impossible to meet a requirement for satisfying throughput requested by a user while keeping the battery remaining time long. In other words, among plural communication systems, a communication system of the best electric wave state is not necessarily coincident with a communication system of the lowest power consumption. The communication system of the lowest power consumption may not satisfy a requested throughput. Therefore, there is a possibility that a communication system incapable of satisfying the user's request is selected because the power consumption is the lowest but the throughput is extremely low in a case where the threshold value is set up high. On the other hand, it is highly possible to select a communication system having the throughput higher than necessary and high power consumption, and the battery remaining time may become short in a case where a threshold value is set up low. Further, communication systems may be frequently switched and a problem of power consumption and deterioration of throughput may be caused by same processes.

It is considered that power consumption and deterioration rate of throughput for changing communication systems are different depending on combination of communication systems between a system in use and a system of switch destination. However, it is impossible for the conventional terminals to select the switch destination in consideration of such the combination. Therefore, although frequent switching of communication systems may be avoided, power deterioration of consumption and throughput becomes high depending on switch destinations, in a case where switching is required. It is also required to add processes for calculating a variable value of communication quality and setting up and updating an adaptive threshold value.

With respect to a fourth step process of Japanese Unexamined Patent Application Publication No. 2005-26878, a switch method of communication system based on power consumption is described. In a case of application having high real-time requirement, although throughput of communication system in use does not satisfy a transmission speed necessary for carrying out the application, a communication system is not switched because switch time is longer than allowable time and communication quality may be greatly deteriorated. On the contrary, in a case of application having low real-time requirement, overhead of communication system switching increases similarly to the conventional case because allowable time is not set up. Further, in a case where a predetermined data amount is downloaded, communication time becomes longer even though a communication system of minimum power consumption is selected, and much more power consumption amount is required as a result. Thus, it is considered that definition of battery usage efficiency depends on used applications.

In recent wireless communication terminal, it has become important to efficiently utilize the limited batteries as a communication transmission speed increases and diversity of installed applications increases. With respect to a multimode terminal installing plural communication systems, communication systems are frequently switched in a case where reception environments are changed, and power consumption and throughput loss required for switching itself increase.

BRIEF SUMMARY OF THE INVENTION

The present invention is made in consideration of the above circumstances. The object of the present invention is to provide a wireless communication terminal and a communication system selection method where battery remaining time is kept long and throughput required for an application in response to a scene is satisfied so that a communication system of high battery usage efficiency can be selected.

(1) In order to accomplish the above object, a wireless communication terminal according to the present invention is a wireless communication terminal capable of selecting a plurality of communication systems comprising:

an application information acquisition unit for acquiring a type of used application;

an evaluation amount calculation unit for changing a communication system selection criterion in response to the type of application thus acquired and calculating an evaluation amount with respect to time adding predetermined time to communication system switching time; and a system selection unit for comparing the evaluation amounts thus calculated and selecting any one of communication systems.

Accordingly, it is possible to select and switch to the communication system having high battery usage efficiency among plural systems in response to real-time requirements of the application. In other words, it is possible to keep battery remaining time of the wireless communication terminal long and select the communication system for satisfying throughput necessary for the application. Further, it is expected to decrease a burden on a side of infrastructure having a different type of network as well as to decrease overhead of switching by decreasing frequency of system switching.

(2) Further, according to the wireless communication terminal of the present invention, the evaluation amount calculation unit uses a power consumption amount per bit as the communication system selection criterion in a case where the used application has low real-time requirement and uses a power consumption value as the communication system selection criterion in a case where the used application has high real-time requirement, for calculating the evaluation amount.

Accordingly, it is possible to select a system which transmits and receives data of a predetermined size at small power consumption amount for an application having the low real-time requirement. For an application having the high real-time requirement, it is possible to select a system which requires momentarily small power and satisfies required throughput.

(3) According to the wireless communication terminal of the present invention, the evaluation amount calculation unit calculates an evaluation amount by using time from when switching the communication system is completed till when relative merits of the communication system before and after the switching changes as the predetermined time.

Accordingly, it is possible to determine advantage or disadvantage of switching of the communication system, to target to optimum time for increasing battery usage efficiency. Further, it is possible to avoid redundant switching and improve battery usage efficiency by including overhead during switching of the communication system for selecting the communication system.

(4) Further, according to the wireless communication terminal of the present invention, the evaluation amount calculation unit calculates a penalty value as the evaluation amount by using a penalty function which is determined in response to the communication system selection criterion. It is possible to determine selection of the communication system consistently and easily by using such the penalty function.

(5) Further, according to the wireless communication terminal of the present invention, the penalty function has a first term which is multiplication of a parameter indicative of the communication system selection criterion and a multiplication term; and a second term which is an addition term added to the first term, the first term represents a penalty value which is laid on a steady state before and after the communication system switching, and the second term represents a penalty value which is laid on the communication system switching itself. Accordingly, it is possible to select the communication system not by simple comparison between communication systems, but by reference to the power consumption, throughput loss and others which are accompanied with communication system switching.

(6) Further, according to the wireless communication terminal of the present invention, the penalty function has, as the addition term, a function which is proportional to the communication system switching time and power consumption used for the switching in a case where the used application has low real-time requirement, and inversely proportional to the time from when switching of the communication system is completed till when relative merits of the communication system before and after the switching changes and a throughput value after the communication system switching.

Accordingly, for the application having low real-time requirement, it is possible to select the communication system which has small data transmission and reception amount which is inhibited by overhead during switching and large data transmission and reception amount after switching, and small power consumption. Therefore, it is possible to transmit and receive large-size data at small power consumption amount.

(7) Further, according to the wireless communication terminal of the present invention, in a case where the used application has high real-time requirement, the penalty function has, as the multiplication term, a ratio of actual throughput to required throughput, and has the addition term which is proportional to a ratio of the communication system switching time to the time adding the predetermined time to the communication system switching time and power consumption required for communication system switching. Accordingly, it is possible to select a system which has short switching time and a small momentary power, and satisfies required throughput for the application having high real-time requirement.

(8) Further, the wireless communication terminal of the present invention further comprises a variation estimation unit for acquiring a variation of a communication environment; and a predetermined time determination unit for adaptively determining the time from when the communication system switching is completed till when relative merits of the communication system before and after the switching changes based on thus acquired variation amount of the communication environment. Accordingly, it is possible to determine appropriate criterion time till the relative merits of the communication system before and after the switching change.

(9) Further, according to the present invention, a communication system selection method for selecting an optimum communication system in a wireless communication terminal comprises:

a step of acquiring a type of used application;

a step of changing a communication system selection criterion in response to the type of application thus acquired and calculating an evaluation amount with respect to time adding predetermined time to communication system switching time; and a step of selecting any one of communication systems in comparison with the evaluation amount thus calculated. Accordingly, it is possible to select/switch to the communication system having high battery usage efficiency among plural systems in response to a real-time requirement of the application.

According to the present invention, it is possible to select and switch to the communication system having high battery usage efficiency among plural systems in response to real-time requirements of the application.

DETAILED DESCRIPTION OF THE INVENTION

Next, embodiments of the present invention are described in reference to the drawings. To make explanation easy to understand, the same numeral reference is put on the same component in respective drawings and duplicated explanation is omitted. Hereinafter, a wireless communication terminal is explained as an example that plural communication systems can be selected using software wireless technology. However, the present invention may be applicable to a wireless communication terminal including hardware corresponding to respective communication systems.
(Configuration of a Wireless Communication Terminal)

Figure 1:
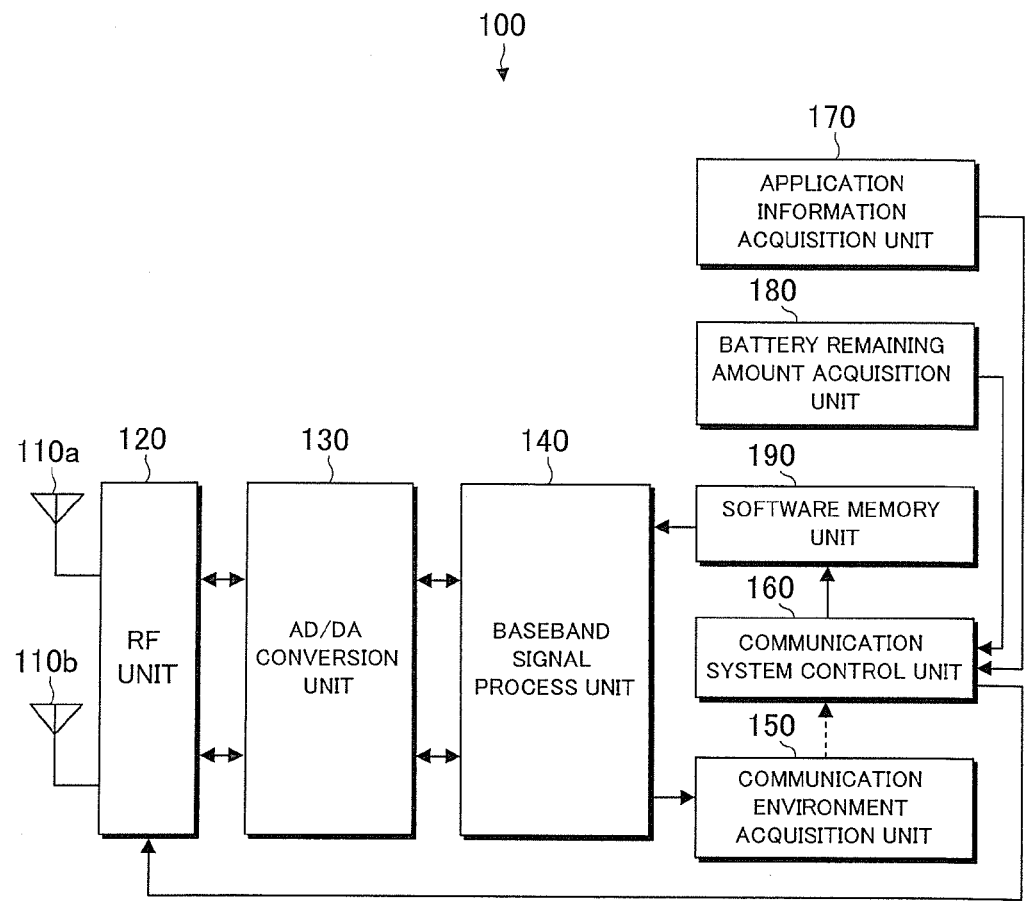
FIG. 1 is a block diagram showing a configuration of a wireless communication terminal according to the present invention.

FIG. 1 is a block diagram showing a configuration of a wireless communication terminal 100. The wireless communication terminal 100 is for example a cell-phone. As shown in FIG. 1, the wireless communication terminal 100 includes transmission and reception antennas 110a and 110b; an RF unit 120; an AD/DA conversion unit 130; a baseband signal process unit 140; a communication environment acquisition unit 150, a communication system control unit 160; an application information acquisition unit 170; a battery remaining amount acquisition unit 180; and a software memory unit 190.

The transmission and reception antennas 110a and 110b transmit and receive high-frequency waves which are modulated in response to communication systems respectively. The RF unit 120 converts thus received high-frequency wave into a baseband signal and converts a baseband signal received from the AD/DA conversion unit 130 into a high-frequency wave. The AD/DA conversion unit 130 converts the baseband signal from an analog signal to a digital signal or from a digital signal to an analog signal.

The baseband signal process unit 140 processes the baseband signal in response to a wireless communication system currently selected. The communication environment acquisition unit 150 acquires communication environment information such as CINR and transmits it to the communication system control unit 160. Therefore, it is possible to select the communication system including evaluation of the communication environment.

The communication system control unit 160 controls selection and change of the communication system. In other words, it calculates a penalty value (evaluation amount) laid on time which adds predetermined time to communication system switching time, based on a communication environment parameter (e.g. CINR value) of the respective communication systems which is acquired by the communication environment acquisition unit 150, an application type acquired by the application information acquisition unit 170, and required throughput. The communication system is selected based on the penalty value.

Accordingly, it is possible to select and switch to the communication system having high battery usage efficiency among plural systems in response to real-time requirement of the application. Further it is simultaneously expected to decrease a burden on an infrastructure side having different type network by controlling frequency of system switching.

Further, the communication system control unit 160 loads software corresponding to the selected communication system to the baseband signal process unit 140 and controls the RF unit 120. Here, the communication system control unit 160 is described in detail later.

The application information acquisition unit 170 acquires information of application type and transmits it to the communication system control unit 160. The battery remaining amount acquisition unit 180 acquires information of battery remaining amount and transmits it to the communication system control unit 160. The software memory unit 190 memorizes software corresponding to various communication systems.

Figure 2:
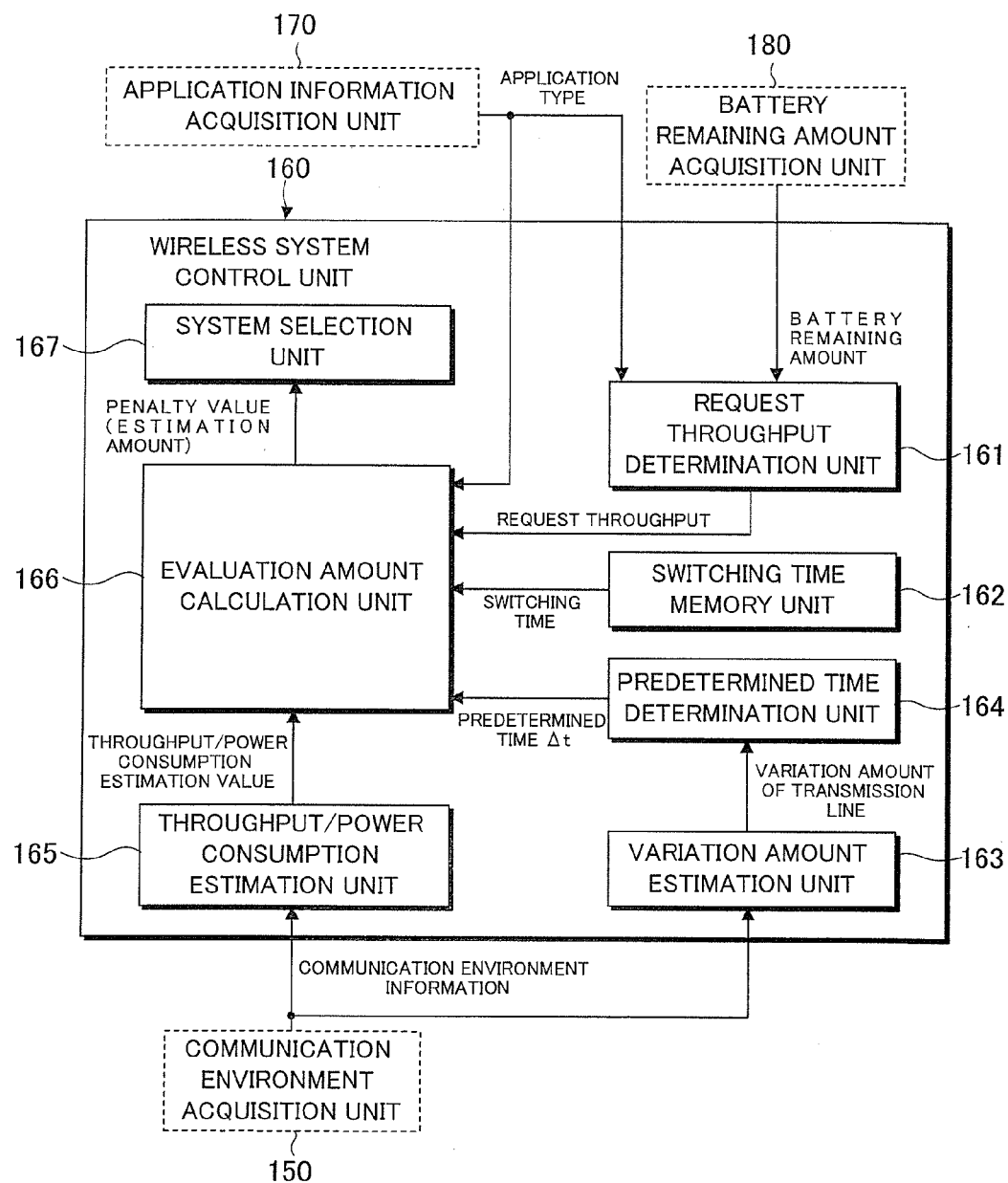
FIG. 2 is a block diagram showing a configuration of a communication system control unit.

FIG. 2 is a block diagram showing a configuration of the communication system control unit 160. As shown in FIG. 2, the communication system control unit 160 includes a request throughput determination unit 161; a switching time memory unit 162; a variation amount estimation unit 163; a predetermined time determination unit 164; a throughput/power consumption estimation unit 165; an evaluation amount calculation unit 166; and a system selection unit 167.

The request throughput determination unit 161 determines request throughput (criterion throughput requested by a user) based on an application type thus obtained from the application information acquisition unit 170 and battery remaining amount information thus obtained from the battery remaining amount acquisition unit 180. The request throughput is a criterion value of throughput requested by an application having high real-time requirement. The switching time memory unit 162 memorizes switching time tij for switching from a communication system i to a communication system j.

The variation amount estimation unit 163 estimates a variation amount of a transmission line (variation amount of communication environment) based on information of the communication environment thus obtained by the communication environment acquisition unit 150 and transmits variation amount information to the predetermined time determination unit 164. The predetermined time determination unit 164 determines predetermined time Δt being time from when switching the communication system is completed till when relative merits of the communication system before and after the switching changes, based on the variation amount of the transmission line. Time Δt is previously determined as predetermined time and transmitted to the evaluation amount calculation unit 166. Therefore, it is possible to determine appropriate criterion time till relative merits of the communication system before and after switching changes.

The throughput/power consumption estimation unit 165 estimates throughput and power consumption based on the communication environment information of respective communication systems which is thus obtained by the communication environment acquisition unit 150 and transmits an estimation value of the throughput and power consumption to the evaluation amount calculation unit 166. Further, the throughput/power consumption estimation unit 165 calculates power consumption amount per bit based on the evaluation value of the throughput and power consumption.

For example, it is presumed that the respective communication systems have plural MCSs (Modulation and Coding Scheme) and a rate is adaptively controlled in response to CINR. It is possible to obtain an estimation value in reference to a previously prepared table of the throughput/power consumption value corresponding to respective CINRs. The following Table 1 shows an example of table of throughput/power consumption value corresponding to respective CINRs. CINR, throughput, power consumption, power consumption amount per bit of the communication system i are represented by $\gamma_i$, $b_i$, $P_i$, and $E_i$, and $E_i = P_i/b_i$ is formed.

TABLE 1

| | CINR $\gamma_i$ | THROUGHPUT $b_i$ | POWER CONSUMPTION $P_i$ | POWER CONSUMPTION AMOUNT PER BIT $E_i$ |
|---|---|---|---|---|
| SYSTEM A (i = 1) | −10~−5 dB . . . | 9.6 kbps . . . | 300 mW . . . | $3.125 \times 10^{-4}$ J . . . |
| SYSTEM B (i = 2) | 10 dB~ −5 dB~0 dB . . . | 2.4 Mbps 38.4 kbps . . . | 550 mW 400 mW . . . | $2.291 \times 10^{-7}$ J $1.042 \times 10^{-5}$ J . . . |
| SYSTEM C (i = 3) | 15 dB~ −5 dB~0 dB . . . | 12.0 Mbps 19.2 kbps . . . | 800 mW 800 mW . . . | $6.667 \times 10^{-8}$ J $4.167 \times 10^{-5}$ J . . . |
| | 20 dB~ | 54.0 Mbps | 1500 mW | $2.778 \times 10^{-8}$ J |

The throughput/power consumption estimation unit 165 receives designation of a communication system from the evaluation amount calculation unit 166, acquires a communication environment parameter such as reception quality information (CINR or RSSI), and estimates throughput and power consumption corresponding to the communication system thus designated by the evaluation amount calculation unit 166 and thus acquired communication environment parameter. Here, the predetermined table which correlates the throughput and power consumption to the communication system and the communication environment parameter is referred to and thus correlated throughput or power consumption is estimated.

The evaluation amount calculation unit 166 selects a communication system selection criterion based on information of the application type thus obtained by the application information acquisition unit 170 and calculates a penalty value (evaluation amount) with respect to time adding the predetermined time to the communication system switching time. In other words, a penalty function decided in response to the communication system selection criterion is applied for calculating the penalty value. For example, as the communication system selection criterion, power consumption amount per bit Ei is used for the application having low real-time requirement, and power consumption Pi is used for the application having high real-time requirement.

Thus, the evaluation amount calculation unit 166 changes a communication system selection criterion due to difference between real-time requirements. Here, for calculation, the value previously memorized by the switching time memory unit 162 is used for the switching time tij. Here, those streaming motion picture files are cited as the application having high real-time requirement. Further, those downloading motion pictures are cited as the application having low real-time requirement. A specific example of the penalty function is described later for high and low real-time requirements respectively.

The system selection unit 167 compares the penalty values thus calculated by the evaluation amount calculation unit 166 and selects the communication system having the minimum penalty value. Thus, it is possible for the wireless communication terminal 100 to select the optimum communication system by using the penalty function in response to the real-time requirement of the application. Therefore, a switching destination which is to have large power consumption and deterioration of throughput is hardly selected. Thus, it is possible to select the communication system having high battery usage efficiency.

(Operation of Wireless Communication Terminal)

Figure 3:
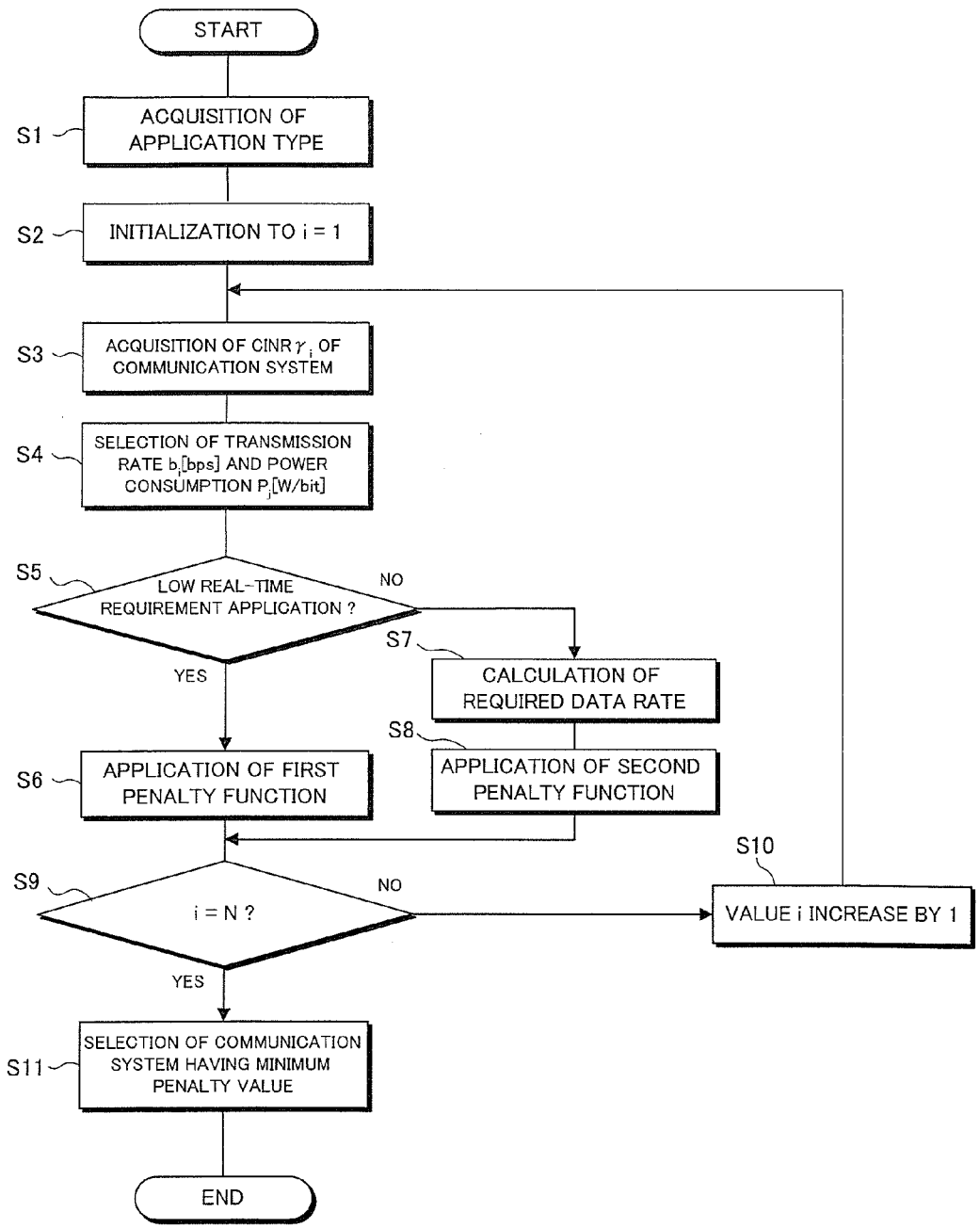
FIG. 3 is a flowchart showing an operation of communication system selection by the wireless communication terminal according to the present invention.

Next, an operation of the wireless communication terminal 100 as configured above is described. FIG. 3 is a flowchart showing an operation of the communication system selection by the wireless communication terminal 100. According to an example of FIG. 3, a number of whole communication systems is referred to as N. Penalty values (evaluation amount) of the application types are respectively calculated after CINR of respective communication systems is acquired and the communication system to have minimum penalty value is selected among N pieces of communication systems. First, the communication system control unit 160 acquires a type of the application (Step S1). Then, the communication system to be reviewed is initialized into i=1 (Step S2).

The communication system control unit 160 acquires CINR$\gamma$i of the communication system i (Step S3) and selects throughput bi[bps] and power consumption Pi[W/bit] of the communication system i based on thus acquired CINR$\gamma$i (Step S4). It is determined whether or not a real-time requirement of the used application is low (Step S5). In a case where it is determined that the real-time requirement of the used application is low, a first penalty function is applied (Step S6). On the other hand, in a case where it is determined that the real-time requirement of the used application is high, request throughput is calculated (Step S7) and a second penalty function is applied (Step S8).

Next, it is determined whether or not i=N, in other word whether or not the whole communication systems are completely reviewed (Step S9). In a case where it is determined not i=N, i is added by 1 (Step S10). On the other hand, in a case where it is determined i=N, penalty values of the whole communication systems are compared and a communication system to have the minimum penalty vale is selected (Step S11), and the operation ends. Therefore, it is possible to select and switch to the communication system having high battery usage efficiency among plural systems in response to the real-time requirement of the application. Here, the above operations can be carried out using a program.

(Selection Criterion of Communication System)

Next, selection criterion of the communication system is described. The wireless communication terminal 100 constantly selects a good communication system by switching selection criteria for respective applications for selecting a communication system having high battery usage efficiency.

With respect to the application having low real-time requirement, for example, a communication system capable of receiving a predetermined data size at the minimum power consumption amount is desirable. Therefore, the power consumption amount per bit is to be as the selection criterion. On the other hand, with respect to the application having high real-time requirement, a communication system having small momentary power and satisfying the requested throughput is desirable. Therefore, a penalty function is applied to a communication system which does not satisfy the requested throughput based on the power consumption as the selection criterion.

Further, a penalty function adding overhead for switching the communication system is defined to the respective selection criteria and a value calculated using the function is to be as a penalty value. The communication system having a small penalty value is selected for avoiding redundant switching of the communication system.

The penalty value is calculated with respect to time which adds the time from when switching of the communication system is completed till when relative merits of the communication system before and after the switching changes to the communication system switching time. Therefore, it is possible to determine advantage or disadvantage of the communication system switching, targeting an optimum time for improving battery usage efficiency. Further, it is possible to avoid redundant switching and improve the battery usage efficiency by including overhead during switching of the communication system for selecting the communication system.

The penalty function is defined on a basis of receivable bit number and power consumption amount for a case where the communication system is maintained and a case where the communication system is switched, respectively. It is possible to determine the communication system consistently and easily by using the penalty function.

Figure 4:
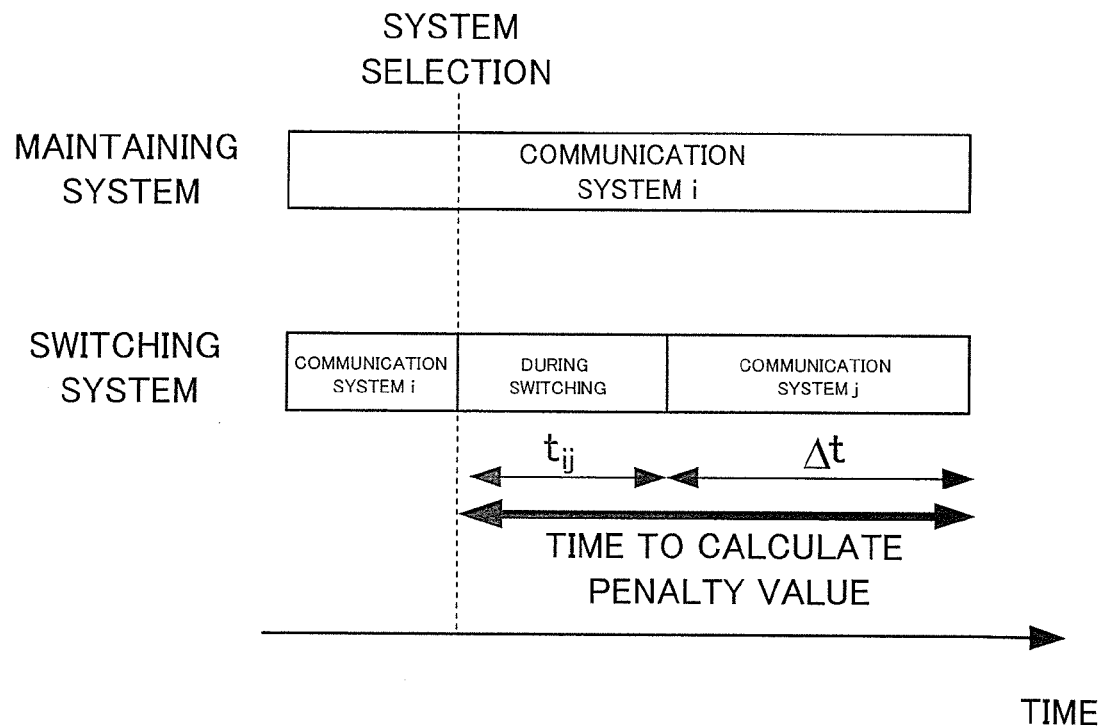
FIG. 4 is a schematic diagram showing correlation between time and communication system when the communication system is selected.

FIG. 4 is a schematic diagram showing correlation between time and the communication system when the communication system is selected. It is determined whether the communication system is maintained or switched to the other communication system at the time of selection of the communication system. The communication system currently employed is referred to as i, a candidate index being a switching destination is referred to as j, and time required for switching is referred to as tij. Further, relative merits of the communication system do not change within the predetermined time $\Delta t$ after switching completion. The selection criterion value is predicted within time tij+$\Delta t$ and the penalty function is produced. Further, it is preferable to adaptively change $\Delta t$ based on the variation amount of the wireless environment.

The penalty functions respectively have a first term which is multiplication of a parameter indicative of selection criterion of the communication system and a multiplication term; and a second term which is an addition term added to the first term. The first term represents a penalty value which is laid on a steady state before and after the communication system switching. The second term represents a penalty value which is laid on the communication system switching itself. Therefore, it is possible to select the communication system not by simple comparison among communication systems but by reference to power consumption, throughput loss, and others which are accompanied with communication system switching. Next, the penalty function and an elicitation process corresponding to real-time requirement of the respective applications are described.

(Penalty Function for Low Real-Time Requirement Application)

Table 2 below shows receivable bit number, power consumption amount, and power consumption amount per bit in a case of maintaining or switching the communication system within time tij+$\Delta t$ to calculate a penalty value. Ri represents power consumption for switching and makes difference from the power consumption during communication before and after switching. Further, the communication environment within time to calculate a penalty value is to be substantially constant and a bit rate and power consumption are presumed not to change since the selection of the communication system.

TABLE 2

|  | MAINTAINING SYSTEM | SWITCHING SYSTEM |
| --- | --- | --- |
| RECEIVABLE BIT NUMBER | $(t_{ij} + \Delta t)b_i$ | $\Delta t b_j$ |
| POWER CONSUMPTION AMOUNT | $(t_{ij} + \Delta t)P_i$ | $t_{ij}R_j + \Delta t P_j$ |
| POWER CONSUMPTION AMOUNT PER BIT | $\dfrac{P_i}{b_i}$ | $\dfrac{P_j}{b_j} + \dfrac{t_{ij}R_j}{\Delta t b_j}$ |

Accordingly, the following formula is obtained as the penalty function (first penalty function) for the low real-time requirement application.

$$Q_j = \begin{cases} E_j & (j = i) \\ E_j + \dfrac{t_{ij}R_j}{\Delta t b_j} & (j \neq i) \end{cases} \text{(FIRST PENALTY FUNCTION)}$$

In other words, in a case of communication system switching, the above described addition term is added as a penalty value. The addition term is a term which is added to the term (term of Ej in the above formula) including a selection criterion of the communication system in a penalty function, and it is the second term in the case of j≠i in the above formula.

The first penalty function has, as the addition term, a function which is proportional to the communication system switching time and power consumption used for the switching and inversely proportional to the time from when switching of the communication system is completed till when relative merits of the communication system before and after the switching changes and a throughput value after communication system switching.

Accordingly, for the application having low real-time requirement, it is possible to select the communication system where the data transmission and reception amount which is inhibited by overhead during switching is small, the data transmission and reception amount after switching is large, and the power consumption is small. Therefore, it is possible to transmit and receive large-size data at small power consumption amount.

(Penalty Function for High Real-Time Requirement Application)

In the application having high real-time requirement, power consumption values are compared. However, in a case where throughput is lower than the required throughput b(req), power consumption for receiving insufficient bit number which is produced within time tij+Δt adding the predetermined time to the switching time is calculated and it is added to the power consumption amount within time to calculate a penalty value. The power consumption amount with penalty (penalty value) is obtained by dividing total power consumption amount by the time tij+Δt to calculate a penalty value. b* satisfies the following formula.

$$b_i^* = \begin{cases} b_i & (b_i < b^{(req)}) \\ b^{(req)} & (b_i \geq b^{(req)}) \end{cases}$$

Figure 5:
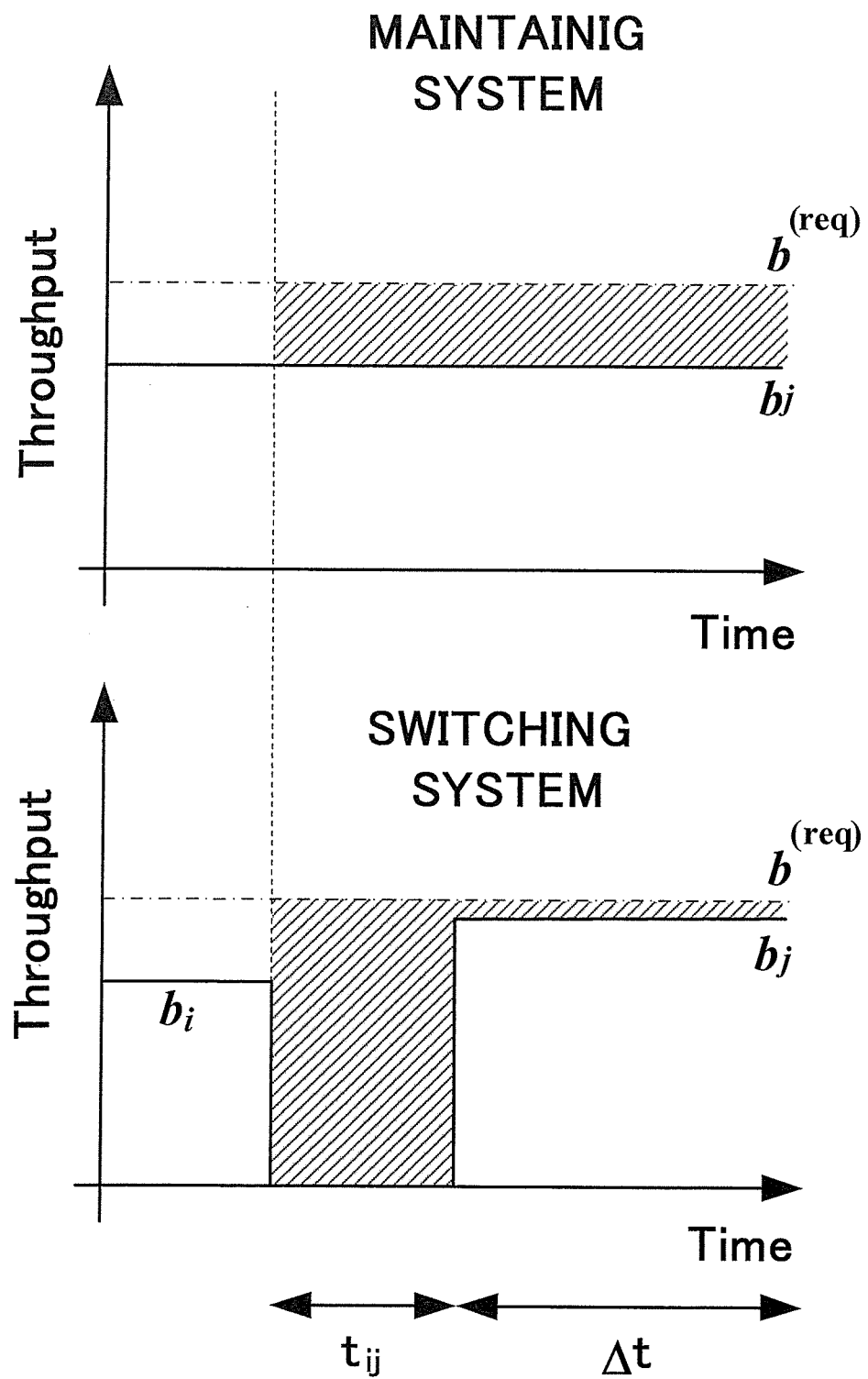
FIG. 5 is a diagram showing an insufficient bit amount in cases of maintaining the system and switching the system.

FIG. 5 is a diagram showing an insufficient bit amount in cases of maintaining the system and switching the system. As shown in FIG. 5, overhead for switching is included in the insufficient bit amount because a bit is not receivable during the time of switching for switching the communication system. The above procedure reflects both of a penalty for unsatisfied throughput required and a penalty for switching overhead. The following Table 3 shows power consumption amount, insufficient bit number, insufficient bit power consumption amount conversion, and power consumption with penalty for maintaining and switching the communication system.

TABLE 3

|  | MAINTAINING SYSTEM | SWITCHING SYSTEM |
| --- | --- | --- |
| POWER CONSUMPTION AMOUNT | $(t_{ij} + \Delta t)P_i$ | $t_{ij}R_j + \Delta t P_j$ |
| INSUFFICIENT BIT NUMBER | $(t_{ij} + \Delta t)(b^{(req)} - b_i^*)$ | $t_{ij}b^{(req)} + \Delta t(b^{(req)} - b_j^*)$ |
| INSUFFICIENT BIT POWER CONSUMPTION AMOUNT CONVERSION | $\dfrac{(t_{ij} + \Delta t)(b^{(req)} - b_i^*)}{b_i^*}P_i$ | $\dfrac{t_{ij}b^{(req)} + \Delta t(b^{(req)} - b_j^*)}{b_j^*}P_j$ |
| POWER CONSUMPTION WITH PENALTY | $\dfrac{b^{(req)}}{b_i^*}P_i$ | $\dfrac{b^{(req)}}{b_j^*}P_j + \dfrac{t_{ij}}{t_{ij} + \Delta t}R_j$ |

Accordingly the following formula is obtained as the penalty function (second penalty function) for the high real-time requirement application.

$$Q_j = \begin{cases} \dfrac{b^{(req)}}{b_j^*}P_j & (j = i) \\ \dfrac{b^{(req)}}{b_j^*}P_j + \dfrac{t_{ij}}{t_{ij} + \Delta t}R_j & (j \neq i) \end{cases} \text{(SECOND PENALTY FUNCTION)}$$

In other words, regardless of switching or not switching the communication system, a multiplication term is laid as a penalty on the communication system having unsatisfied throughput required and an addition term is laid as a penalty of switching on the communication system requiring switching. The multiplication term is a term where a selection criterion (Pj in the above formula) of the communication system is multiplied in the penalty function. That is b(req)/b*j in the above formula.

As described above, the second penalty function has, as the multiplication term, a ratio of actual throughput to required throughput, and has the addition term which is proportional to a ratio of the communication system switching time to the time adding the time from when switching the communication system is completed till when relative merits of the communication system before and after the switching changes to the communication system switching time and proportional to power consumption used for switching the communication system. Therefore, it is possible to select a system where switching time is short, momentary power is small, and the required throughput is satisfied, for the application having high real-time requirement.

Here, the required throughput b(req) is calculated based on the throughput required by the application, which is obtained from the application information acquisition unit 170, and the battery remaining amount which is obtained by the battery remaining amount acquisition unit 180. For example, in a case where a battery remaining amount is enough, required throughput is set up larger than necessary throughput. In a case where a battery remaining amount is small, the required throughput is set up equal to the necessary throughput.

EXAMPLE

Figure 6:
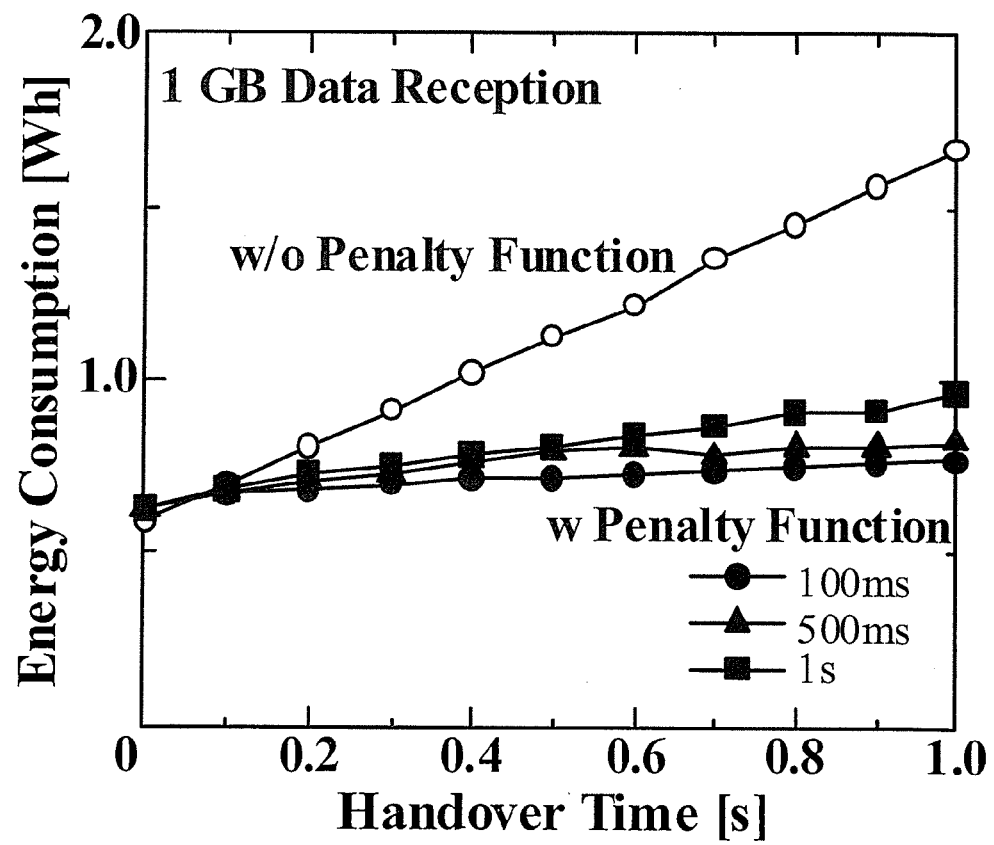
FIG. 6 is a graph showing a simulation result on an application having low real-time requirement.

FIG. 6 is a graph showing a simulation result on an application having low real-time requirement. FIG. 6 shows total power consumption amount for switching time. It is presumed that two communication systems are compared during receiving data, a transfer speed of the user is 3 km per hour, and SINR changes depending on distance attenuation/shadowing accompanied with transfer. Further, switching time is all equal regardless of the communication systems.

A data amount is 1 GB. A total power consumption amount till a whole data are received is calculated for a case where the communication system is switched using no penalty function and a case where the communication system is switched using the first penalty function described above. In the case of using no penalty function, power consumption amount per bit is used as a selection criterion. In the case of using the penalty function, a simulation is made for predetermined time Δt=100 ms, 500 ms, is respectively. The result shows that the power consumption amount increases as the switching time increases in the case of using no penalty function. Meanwhile, it is found possible to greatly cut increase of the power consumption in the case of using the penalty function. Thus it is substantiated that the present invention makes it possible to select the communication system having high battery usage efficiency.

Here, although the penalty value is used as an evaluation amount for determining selection of the communication system in the above embodiments, the evaluation amount is not limited to the penalty value. For example, the above described penalty value Q may be modified, other evaluation amount C-Q may be defined with respect to the constant C, and the evaluation amount which increases as the communication system becomes more preferable. Such the evaluation amount includes modification of the penalty value as described above.

The invention claimed is:

1. A wireless communication terminal capable of selecting a plurality of communication systems, comprising:
an application information acquisition unit for acquiring a type of used application;
an evaluation amount calculation unit for changing a communication system selection criterion in response to the type of application and calculating an evaluation amount with respect to a time that is the sum of a communication system switching time and a predetermined time after switching completion where a selectable communication system is switched and maintained, respectively, for evaluating switching of communication systems and steady states before and after switching with a selection criterion as an evaluation criterion; and a system selection unit for comparing the evaluation amounts thus calculated, selecting any one of communication systems, and determining whether a communication system should be switched or maintained;

wherein the predetermined time after switching completion is determined on the basis of a variation amount of a communication environment between communication systems before and after the switching estimated by obtained information of the communication environment.

2. The wireless communication terminal according to claim 1, wherein, the evaluation amount calculation unit uses a power consumption amount per bit as the communication system selection criterion in a case where the used application has low real-time requirement and uses a power consumption value as the communication system selection criterion in a case where the used application has high real-time requirement, for calculating the evaluation amount.

3. The wireless communication terminal according to claim 1, wherein the evaluation amount calculation unit calculates an evaluation amount by using time from when switching the communication system is completed until relative merits of the communication system before and after the switching changes as the predetermined time.

4. The wireless communication terminal according to claim 1, wherein the evaluation amount calculation unit calculates a penalty value as the evaluation amount by using a penalty function which is determined in response to the communication system selection criterion.

5. The wireless communication terminal according to claim 4, wherein the penalty function has:
   a first term which is multiplication of a parameter indicative of the communication system selection criterion and a multiplication term; and
   a second term which is an addition term added to the first term, the first term representing a penalty value which is laid on a steady state before and after the communication system switching, and the second term representing a penalty value which is laid on the communication system switching itself.

6. The wireless communication terminal according to claim 5, wherein, in a case where the used application has low real-time requirement, the penalty function has, as the addition term, a function which is proportional to the communication system switching time and power consumption used for the switching and inversely proportional to the time from when switching of the communication system is completed till when relative merits of the communication system before and after the switching changes and a throughput value after the communication system switching.

7. The wireless communication terminal according to claim 5, wherein, in a case where the used application has high real-time requirement, the penalty function has, as the multiplication term, a ratio of actual throughput to required throughput, and has the addition term which is proportional to a ratio of the communication system switching time to the time adding the predetermined time to the communication system switching time and power consumption required for communication system switching.

8. The wireless communication terminal according to claim 3, further comprising:
   a variation amount estimation unit for acquiring a variation amount of a communication environment; and
   a predetermined time determination unit for adaptively determining the time from when the communication system is switched and completed till when relative merits of the communication system before and after the switching changes based on thus acquired variation amount of the communication environment.

9. A communication system selection method for selecting an optimum communication system in a wireless communication terminal comprising:
   a step of acquiring a type of used application;
   a step of changing a communication system selection criterion in response to the type of application thus acquired and calculating an evaluation amount with respect to a time that is the sum of a communication system switching time and a predetermined time after switching completion where a selectable communication system is switched and maintained, respectively, for evaluating switching of communication systems and steady states before and after switching with a selection criterion as an evaluation criterion; and
   a step of selecting any one of communication systems in comparison with the evaluation amount thus calculated and determining whether a communication system should be switched or maintained;
   wherein the predetermined time after switching completion is determined on the basis of a variation amount of communication environment between communication systems before and after the switching estimated by obtained information of the communication environment.

* * * * *